US012677031B2

(12) United States Patent
Zhang et al.

(10) Patent No.: US 12,677,031 B2
(45) Date of Patent: Jul. 7, 2026

(54) MULTIMEDIA FORMATS FOR MULTIPLE DISPLAY AREAS IN A DISPLAY DEVICE

(71) Applicant: ROKU, INC., San Jose, CA (US)

(72) Inventors: Dengzhi Zhang, San Jose, CA (US); Hugo Du Plooy, San Jose, CA (US)

(73) Assignee: ROKU, INC., San Jose, CA (US)

( * ) Notice: Subject to any disclaimer, the term of this patent is extended or adjusted under 35 U.S.C. 154(b) by 8 days.

(21) Appl. No.: 17/963,466

(22) Filed: Oct. 11, 2022

(65) Prior Publication Data

US 2024/0121471 A1 Apr. 11, 2024

(51) Int. Cl.
H04N 21/44 (2011.01)
H04N 21/431 (2011.01)
H04N 21/4402 (2011.01)

(52) U.S. Cl.
CPC . H04N 21/440272 (2013.01); H04N 21/4316 (2013.01); H04N 21/44029 (2013.01)

(58) Field of Classification Search
None
See application file for complete search history.

(56) References Cited

U.S. PATENT DOCUMENTS

| | | | | |
|---|---|---|---|---|
| 2002/0172495 A1* | 11/2002 | Han | | G11B 31/00 |
| 2008/0088740 A1* | 4/2008 | Kondo | | H04N 21/47 |
| | | | | 348/556 |
| 2009/0146994 A1* | 6/2009 | Goh | | G06T 11/60 |
| | | | | 345/418 |
| 2011/0007212 A1* | 1/2011 | Lee | | G06F 3/04817 |
| | | | | 348/556 |
| 2014/0365873 A1* | 12/2014 | Willis | | G06F 40/106 |
| | | | | 715/243 |
| 2023/0100652 A1* | 3/2023 | Jang | | A63F 13/5378 |
| | | | | 463/31 |

* cited by examiner

*Primary Examiner* — Samira Monshi
(74) *Attorney, Agent, or Firm* — Sterne, Kessler, Goldstein & Fox P.L.L.C.

(57) ABSTRACT

Disclosed herein are system, apparatus, method and/or computer program product embodiments for a multimedia environment that includes a computing device to display multiple multimedia segments within multiple display areas of a display device. The display device can include a first display area to display a first multimedia segment, and a second display area to display a second multimedia segment, which may be an advertisement related to the first multimedia segment. In some embodiments, to fit into the first display area, the first multimedia segment may be in a first format when received, and converted into a second format to fit into the first display area before being displayed in the first display area.

17 Claims, 7 Drawing Sheets

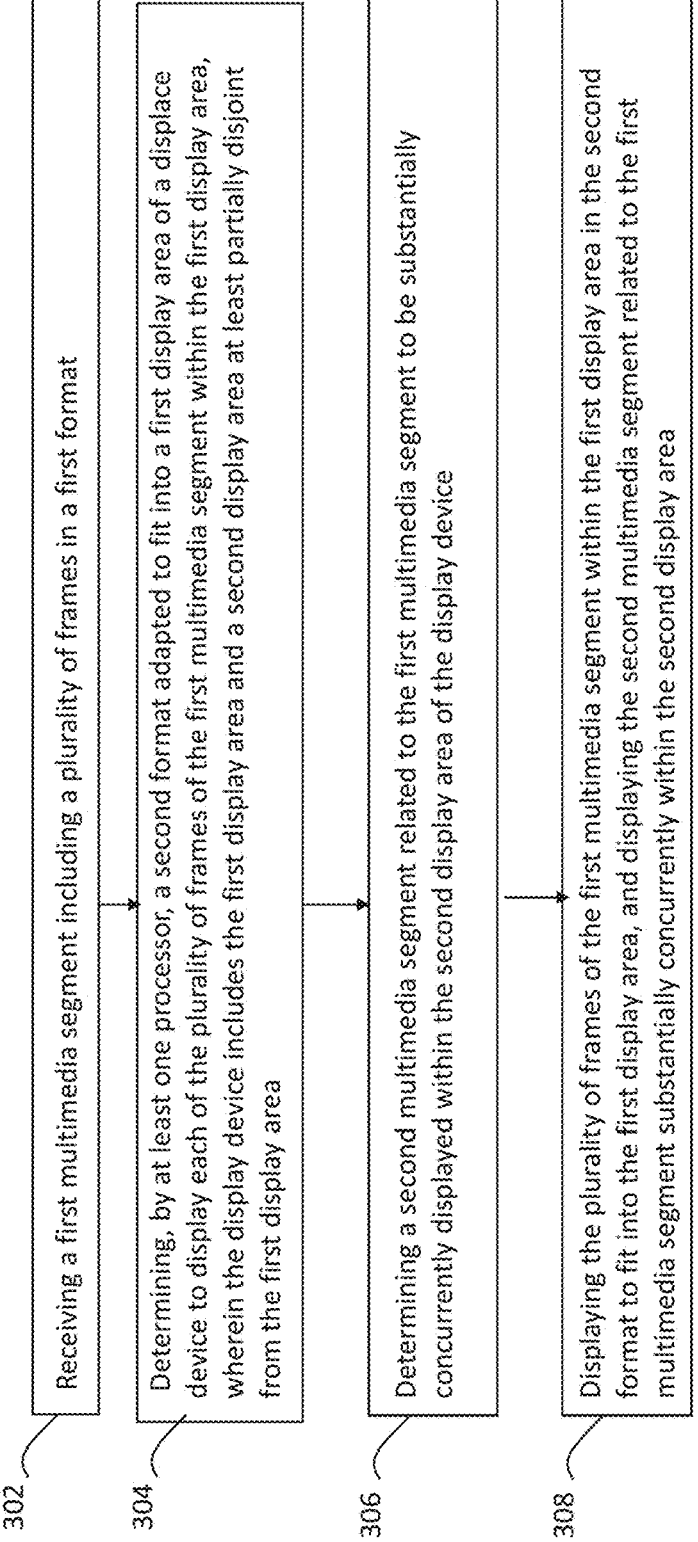

302 — Receiving a first multimedia segment including a plurality of frames in a first format 304 — Determining, by at least one processor, a second format adapted to fit into a first display area of a displace device to display each of the plurality of frames of the first multimedia segment within the first display area, wherein the display device includes the first display area and a second display area at least partially disjoint from the first display area 306 — Determining a second multimedia segment related to the first multimedia segment to be substantially concurrently displayed within the second display area of the display device 308 — Displaying the plurality of frames of the first multimedia segment within the first display area in the second format to fit into the first display area, and displaying the second multimedia segment related to the first multimedia segment substantially concurrently within the second display area

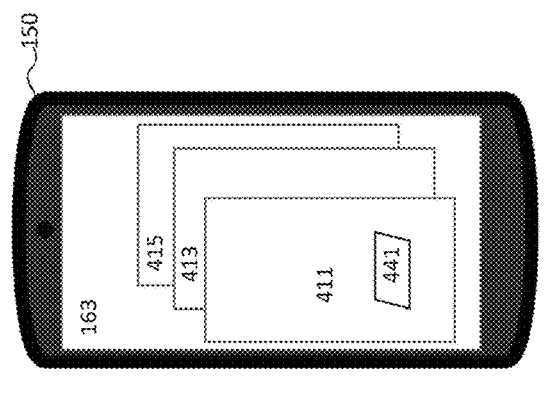
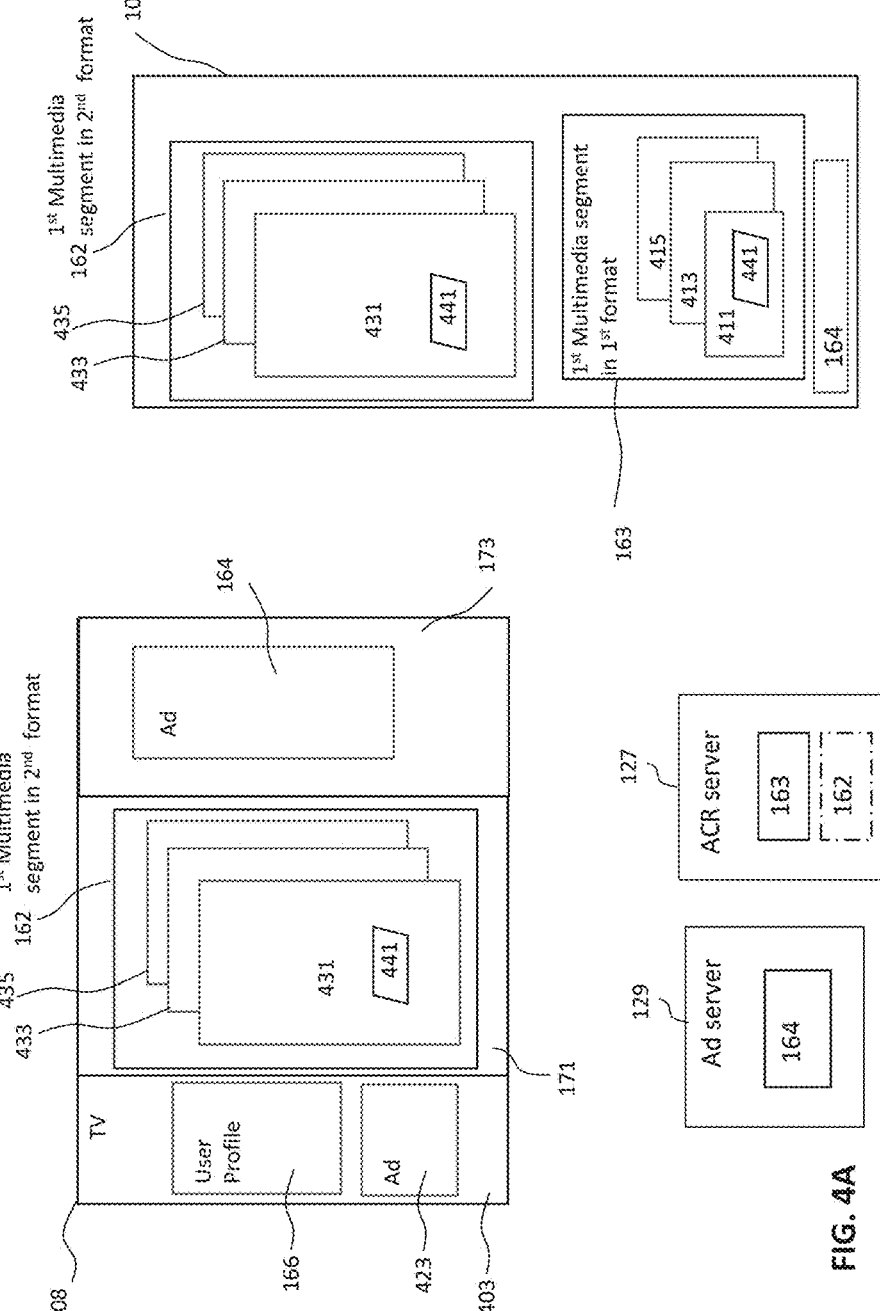
FIG. 4A

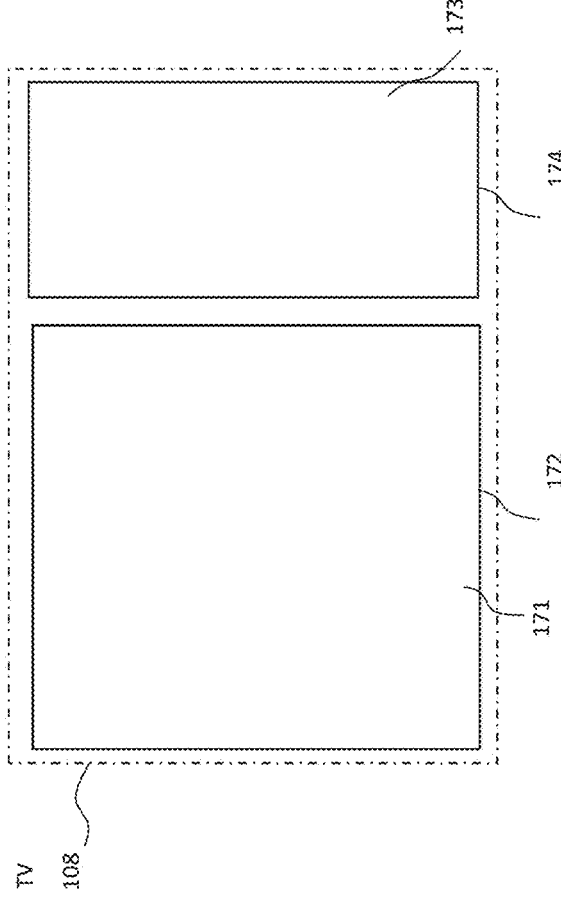
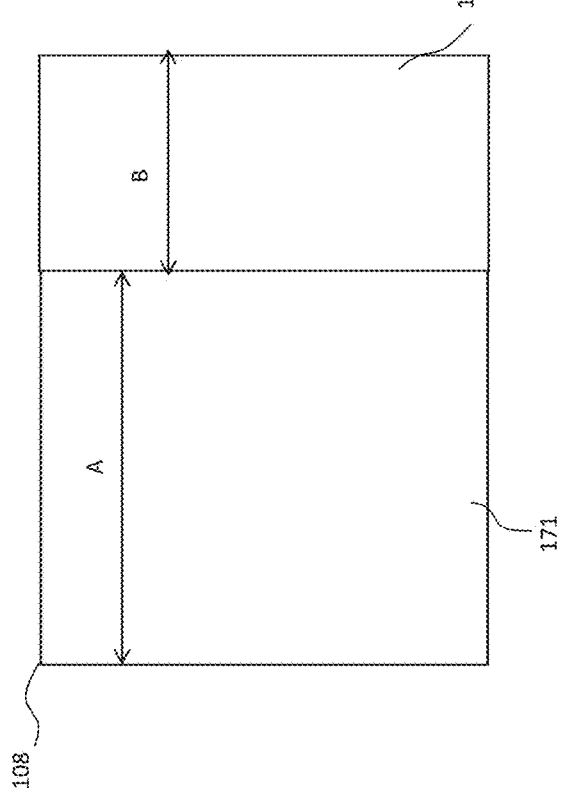
FIG. 4B

MULTIMEDIA FORMATS FOR MULTIPLE DISPLAY AREAS IN A DISPLAY DEVICE

BACKGROUND

Field

This disclosure is generally directed to displaying multimedia segments or content in a display device.

Background

Television, sometimes shortened to TV, is a communication medium for displaying multimedia content including video and audio. Generally, the term can refer to a television set, or a medium of television transmission. Television is a mass medium for entertainment, news, and sports, and advertising. Digital television (DTV) generally refers to transmission and display of audio and video by digitally processed and multiplexed signals, in contrast to analog signals used by traditional analog television. A TV can be generally viewed as a display device to display images and sounds, e.g., multimedia segments or content. However, there are still challenges on how to display various multimedia segments or content in a display device, such as a TV.

SUMMARY

Provided herein are system, apparatus, article of manufacture, method and/or computer program product embodiments, and/or combinations and sub-combinations thereof, for displaying multiple multimedia segments in various formats within multiple display areas of a display device. An example of a display device can be a television (TV) or a TV set, although this disclosure is not limited to that embodiment. The display device can include a first display area to display a first multimedia segment, and a second display area to display a second multimedia segment, which may be an advertisement related to the first multimedia segment. In some embodiments, to fit into the first display area, the first multimedia segment may be in a first format when received, and converted into a second format to fit into the first display area before being displayed in the first display area.

An example embodiment of a multimedia environment includes a display device and a computing device which can serve as a media device. The display device includes a first display area and a second display area at least partially disjoint from the first display area. The media device may perform a method including various operations. In some embodiments, the media device may receive a first multimedia segment including a plurality of frames in a first format, and determine a second format adapted to fit into the first display area of the display device to display each of the plurality of frames of the first multimedia segment within the first display area. The media device may further determine a second multimedia segment related to the first multimedia segment to be substantially concurrently displayed within the second display area of the display device. Furthermore, the media device may display the plurality of frames of the first multimedia segment within the first display area in the second format to fit into the first display area, and display the second multimedia segment related to the first multimedia segment substantially concurrently within the second display area.

In some embodiments, the second format can be different from the first format, and the media device can convert the first multimedia segment in the first format into the second format before displaying the plurality of frames of the first multimedia segment within the first display area in the second format. The first format can include a first video aspect ratio, and the second format can include a second video aspect ratio different from the first video aspect ratio. In some embodiments, the first video aspect ratio or the second video aspect ratio includes a ratio of 19:6, 4:3, 16:10, 47:20, 16:9, 1.375:1, 1.78:1, 1.85:1, 2.39:1, 2.40:1, 2.35:1, 2.39:1, 9:16, or 4:5. In some embodiments, the first format can be the same as the second format, the first display area can be in a primary screen, and the second display area can be in a secondary screen.

In some embodiments, the second display area can be completely disjoint from the first display area. The first display area and the second display area can be of a rectangular shape of a substantially same height. In some embodiments, the first display area can have a first width A, the second display area can have a second width B satisfying a golden ratio condition $(A+B)/A=1.618$. In some embodiments, the second display area can overlay with the first display area and is partially disjoint from the first display area, and the second multimedia segment can be an on-screen display (OSD) of the first multimedia segment. In addition, the first display area and the second display area together can have a capability to display the first multimedia segment in a third format different from the first format.

In some embodiments, a computing device can include a display device including a first display area and a second display area at least partially disjoint from the first display area, one or more memories, and at least one processor, each coupled to the display device and at least one of the memories and configured to perform various operations. In some embodiments, the at least one processor can be configured to receive a first multimedia segment including a plurality of frames in a first format, and determine a second format adapted to fit into the first display area of the display device to display each of the plurality of frames of the first multimedia segment within the first display area. The media device may further determine a second multimedia segment related to the first multimedia segment to be substantially concurrently displayed within the second display area of the display device. Furthermore, the media device may display the plurality of frames of the first multimedia segment within the first display area in the second format to fit into the first display area, and display the second multimedia segment related to the first multimedia segment substantially concurrently within the second display area.

BRIEF DESCRIPTION OF THE FIGURES

The accompanying drawings are incorporated herein and form a part of the specification.

FIG. 3 illustrates an example process for displaying multiple multimedia segments in various formats within multiple display areas of a display device, according to some embodiments.

FIGS. 4A-4B illustrate an example multimedia environment to display multiple multimedia segments in various formats within multiple display areas of a display device, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1A:
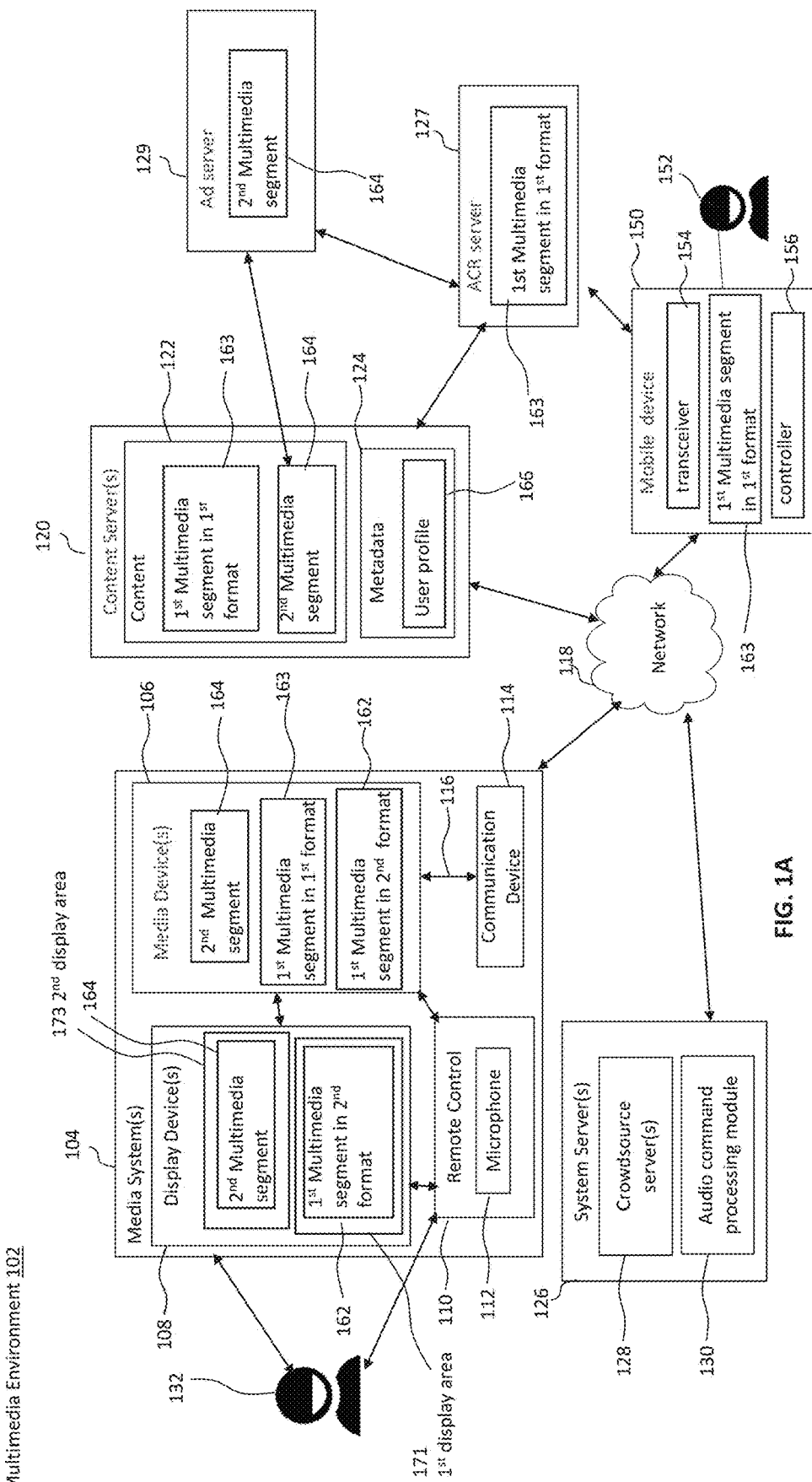
FIGS. 1A-1B illustrate a block diagram of a multimedia environment, according to some embodiments.

Television, sometimes shortened to TV or TV set, can display multimedia segments or content including video and audio. Digital television (DTV) is the transmission of audio and video by digitally processed and multiplexed signals, in contrast to the analog signals used by analog television. TV can be generally viewed as a display device to display multimedia segments or content. The content being displayed onto a display device together with the display device itself have been evolving. In some ways, a traditional movie, such as a film being displayed onto a film screen, can be viewed as first generation multimedia content, while traditional broadcast TV content displayed onto a TV can be viewed as second generation multimedia content. In addition, computer monitor based video content, such as YouTube® multimedia content, can be viewed as third generation multimedia content. Moreover, smart phone based multimedia content, such as short duration video, e.g., TikTok® video or Instagram® video, can be viewed as fourth generation multimedia content. Accordingly, the display device may include a movie screen, a TV set, a computer monitor, or a smart phone or other handheld devices. Various multimedia contents displayed on a display device can have its advantages and useful features. For example, a movie displayed onto a film screen can last 90 to 180 minutes normally so that viewers can watch in a theater. TV series are suitable for people to watch in front of a TV set at night. In addition, YouTube® videos are suitable for people to browse using an internet browser. Furthermore, everyone with a smart phone can create and post short duration videos on TikTok® instantly. Generally, viewing on the big screen, such as a film screen or a TV display, have seen significant growth and its popularity has led to the success of YouTube® on the TV set.

Conventionally, advertisements are often inserted into the presentation of multimedia content to bring viewers' attention to the subjects of the advertisements during the presentation of multimedia content. The original multimedia content can be broken into multiple multimedia segments so that advertisements can be presented between multimedia segments. Such a presentation technique for advertisements may be referred to as time domain advertisement. However, time domain advertisement can have various drawbacks. For example, in some long continuous events, such as a soccer game, the Olympic game open or close ceremony, etc., breaking the content of such long continuous events into multiple multimedia segments may be annoying or frustrating to the viewers since the viewers may want to follow through the entire events without interruption.

Embodiments herein present a different technique for advertisements, which may be referred to as space domain advertisement. Instead of breaking the presentation of a long continuous event into multiple multimedia segments, embodiments herein can reduce the display area on a display device used to present such events, so that some free space or display area can be left on the display device to display advertisements substantially concurrently with displaying the events of interest such as a soccer game, an Olympic game open or close ceremony. Accordingly, the display device is divided into two different display areas, a first display area to display the multimedia content of the event of interests, and a second display area to display an advertisement substantially concurrently. With the ever increasing size of the display devices, the viewers may have limited negative impact on the user experience in watching the presentation of multimedia content on the first display area, which is a reduced display area. Accordingly, such space domain advertisement presentation can have little impact to the viewers' experience, while the viewers may watch both the advertisement and the multimedia events of interest at substantially the same time.

In some embodiments, when presenting a multimedia content or segment, there may naturally be a free space available on the display device. For example, many short duration videos are generated with the portrait format or vertical format by a mobile device. When such short duration video are presented in the same vertical format on a wide screen TV that normally displays multimedia content in the landscape or horizontal format, the wide screen TV display can have a blank space on the left and/or right sides of the area where the video being displayed in the portrait format. Such blank space can be the free space used for presenting advertisement substantially concurrently with the multimedia content of interests.

In some embodiments, when the multimedia content or segment is received in a first format that is the same format as the presentation format for the display device to occupy the entire display area of the display device, the media device can convert the multimedia segment to a second format different from the first format and adapted to fit into a first display area of the display device. As a result, when displayed in the second format, the multimedia content will only occupy the first display area, leaving a second display area of the display device free to have a second multimedia segment related to the first multimedia segment to be substantially concurrently displayed within the second display area of the display device.

Various embodiments of this disclosure may be implemented using and/or may be part of a multimedia environment 102 shown in FIG. 1A. It is noted, however, that multimedia environment 102 is provided solely for illustrative purposes, and is not limiting. Embodiments of this disclosure may be implemented using and/or may be part of environments different from and/or in addition to multimedia environment 102, as will be appreciated by persons skilled in the relevant art(s) based on the teachings contained herein. An example of multimedia environment 102 shall now be described.

Multimedia Environment

FIG. 1A illustrates a block diagram of multimedia environment 102, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1A, as will be appreciated by persons skilled in the relevant art(s) based on the teachings contained herein.

In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. Media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with media system 104 to select and consume content. User 132 may interact with media system 104 through a remote control device 110. User 132 may be a viewer, a consumer, or both.

Each media system 104 may include one or more media devices 106 each coupled to one or more display devices 108. Media device 106 may be referred to as a computing device as well. It is noted that terms such as "coupled," "connected to," "attached," "linked," "combined" and similar terms may refer to physical, electrical, magnetic, logical, etc., connections, unless otherwise specified herein.

Media device 106 may be a streaming media device, a streaming set-top box (STB), cable and satellite STB, a DVD or BLU-RAY device, an audio/video playback device, cable box, and/or a digital video recording device, to name just a few examples. Display device 108 may be a monitor, a television (TV or TV set), a computer, a computer monitor, a smart phone, a tablet, a wearable (such as a watch or glasses), an appliance, an internet of things (IoT) device, and/or a projector, to name just a few examples. In some embodiments, media device 106 can be a part of, integrated with, attached to, operatively coupled to, and/or connected to its respective display device 108. Media device 106 can provide media content, such as media segment 162 and media segment 164 to display device 108.

Figure 1B:
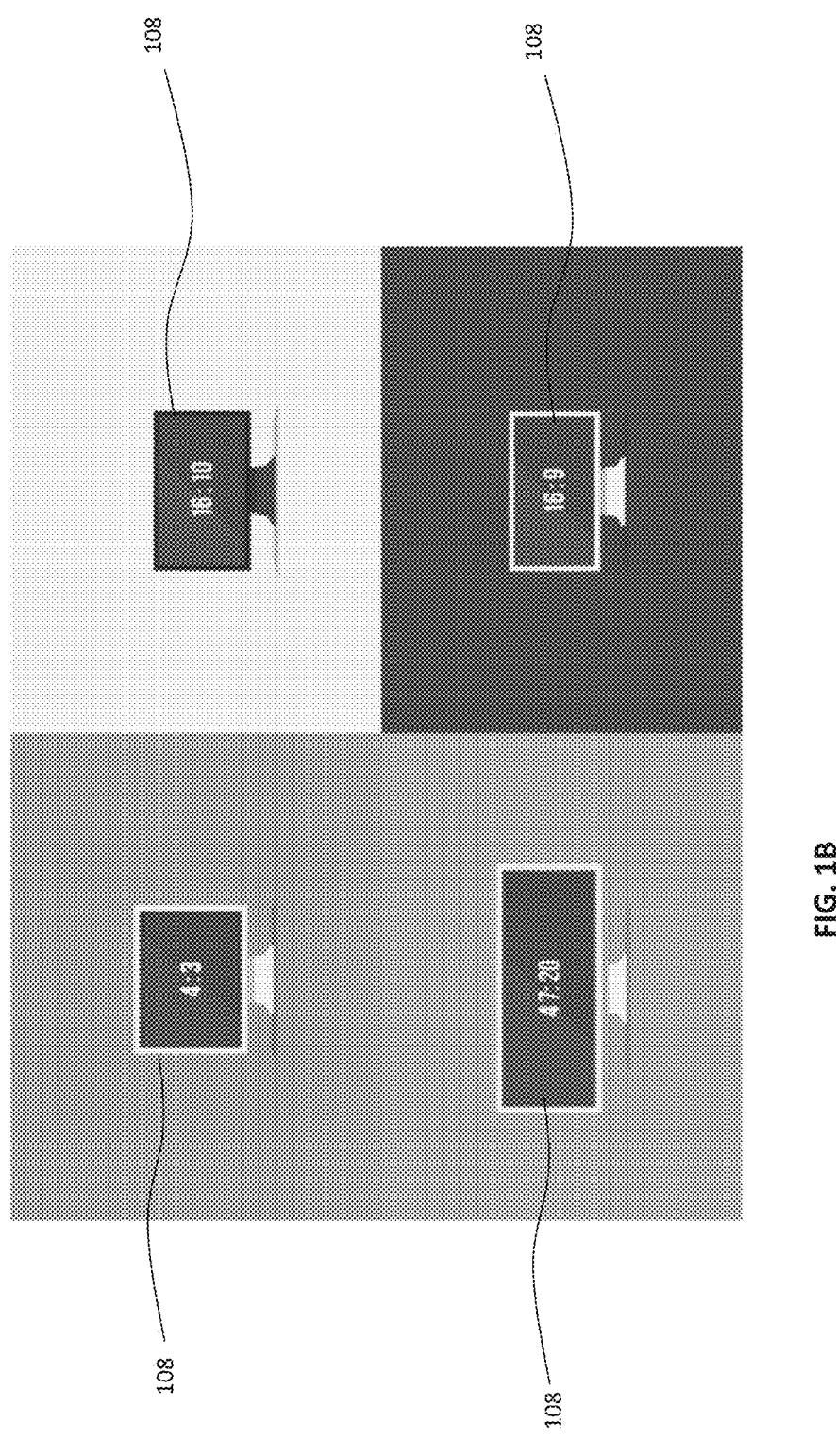

In some embodiments, display device 108 can provide resolutions selected from 1920×1080 pixels, 1280×720 pixels, 2560×1440 pixels, 2048×1080 pixels, 3840×2160 pixels, 7680×4320 pixels, 640×480 pixels, or any other resolutions known to one having ordinary skill in the art. Display device 108 can support a video aspect ratio such as 4:3, 16:9, 1.77:1, 1 9:1, as shown in FIG. 1B. Display device 108 can support other aspect ratios as well. Display device 108 can be a TV set, such as a smart TV.

In some embodiments, display device 108 may include a first display area 171 to display multimedia segment 162 and a second display area 173 to display multimedia segment 164. In some embodiments, the second display area 173 can be disjoint from the first display area 171. The first display area 171 and the second display area 173 can be of a rectangular shape of a substantially same height. In some embodiments, the second display area 173 can overlay with the first display area 171, and multimedia segment 164 can be an on-screen display (OSD) of multimedia segment 162.

Each media device 106 may be configured to communicate with network 118 via a communication device 114. Communication device 114 may include, for example, a cable modem or satellite TV transceiver. Media device 106 may communicate with communication device 114 over a link 116, where link 116 may include wireless (such as WiFi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control device 110. Remote control device 110 can be any component, part, apparatus and/or method for controlling media device 106, display device 108, such as a remote control device, a tablet, laptop computer, smartphone, wearable, on-screen controls, integrated control buttons, audio controls, or any combination thereof, to name just a few examples. In an embodiment, remote control device 110 wirelessly communicates with media device 106, or display device 108 using cellular, Bluetooth, infrared, etc., or any combination thereof.

Multimedia environment 102 may include a plurality of content servers 120 (also called content providers). Although only one content server 120 is shown in FIG. 1A, in practice the multimedia environment 102 may include any number of content servers 120. Each content server 120 may be configured to communicate with network 118.

Each content server 120 may store content 122 and metadata 124. Content 122 may include multimedia segment 163 and multimedia segment 164, which can include any combination of music, videos, movies, TV programs, multimedia, images, still pictures, text, graphics, gaming applications, advertisements, programming content, public service content, government content, local community content, software, and/or any other content or data objects in electronic form. Content 122 may be the source for media content, e.g., multimedia segment 163 and multimedia segment 164, stored in media device 106, which may be displayed on display device 108.

In some embodiments, multimedia segment 164 can include an advertisement related to multimedia segment 163 or user profile 166 of multimedia segment 162. The advertisement related to multimedia segment 163 can be fetched from an advertisement server 129 coupled to content server 120. The content of multimedia segment 163 can include audio content, and multimedia segment 164 can be related to the audio content of multimedia segment 163. In some embodiments, the content of multimedia segment 163 can include at least one object included in a frame of multimedia segment 163, and multimedia segment 164 can be related to the at least one object included in the frame of multimedia segment 163. The at least one object included in the frame of multimedia segment 163 can be identified by performing image recognition analysis of the frame. In some embodiments, the content of multimedia segment 163 can include automatic content recognition (ACR) content recognized by an ACR server 127, and multimedia segment 164 can be related to the ACR content of multimedia segment 163.

In some embodiments, multimedia segment 163 can be in a first format, and media device 106 can determine a second format adapted to fit into the first display area 171 to display multimedia segment 163 within the first display area 171. In some embodiments, the second format can be different from the first format, and media device 106 can convert multimedia segment 163 in the first format into multimedia segment 162, which can have the same content as multimedia segment 163 but in the second format. Afterwards, media device 106 can send multimedia segment 162 in the second format to be displayed on the first display area 171 of display device 108. In addition, the first display area 171 and the second display area 173 together can have a capability to display multimedia segment 163 in a third format, which can be different from the first format or the second format.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 can include user profile 166 of multimedia segment 163. Metadata 124 may also or alternatively include links to any such information pertaining or relating to content 122.

Metadata 124 may also or alternatively include one or more indexes of content 122, such as but not limited to a trick mode index.

Multimedia environment 102 may include one or more system servers 126. System servers 126 may operate to support media device 106 from the cloud. It is noted that the structural and functional aspects of system servers 126 may wholly or partially exist in the same or different ones of system servers 126. System servers 126 and content server 120 together may be referred to as a media server system. An overall media system may include a media server system and media system 104. In some embodiments, a media system may refer to the overall media system including the media server system and media system 104.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users 132 watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streaming of the movie.

System servers 126 may also include an audio command processing module 130. As noted above, remote control device 110 may include a microphone 112. Microphone 112 may receive audio data from user 132 (as well as other sources, such as display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control device 110 is transferred to media device 106, which is then forwarded to audio command processing module 130 in system servers 126. Audio command processing module 130 may operate to process and analyze the received audio data to recognize a verbal command from user 132. Audio command processing module 130 may then forward the verbal command back to media device 106 for processing.

Figure 2:
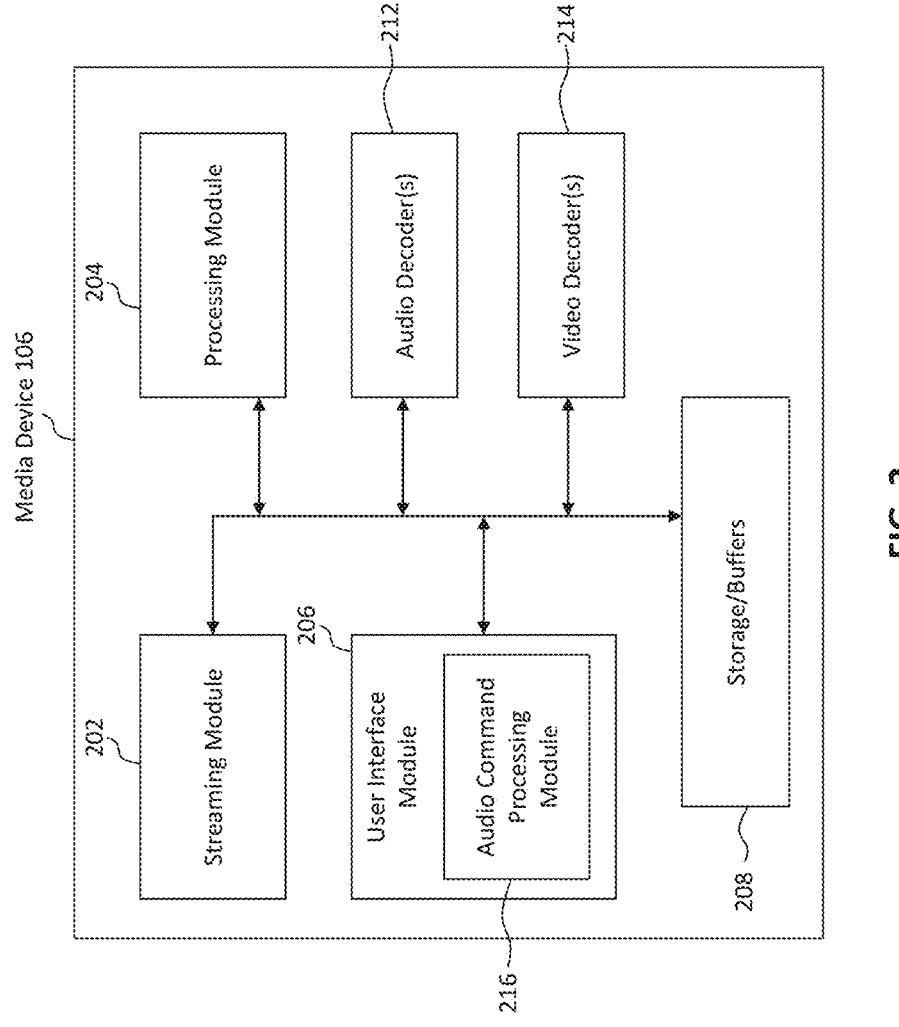
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

In some embodiments, multimedia environment 102 may include a mobile device 150 accessed by a user or consumer 152. In some embodiments, mobile device 150 can include a transceiver 154 configured to wirelessly communicate with a computing device, and a controller 156 coupled to the transceiver and configured to perform various operations. Communication between mobile device 150 with the computing device such as media device 106 or content sever 120 may be through transceiver 154 and network 118. User 152 may generate multimedia segment 163 using mobile device 150, where multimedia segment 163 may be uploaded into content server 120, and further transmitted to media device 106 and displayed on display device 108.

In some embodiments, multimedia segment 163 may be created in a vertical format by mobile device 150, and display device 108 may be a smart television (TV) capable to display the multimedia segment in a horizontal format.

In some embodiments, mobile device 150 can include a handheld terminal, a cellular phone (e.g., a smart phone), a personal digital assistant (PDA), a wireless modem, a wireless communication device, a handheld device, a laptop, a desktop, a cordless phone, a wireless local loop station, a tablet, a camera, a gaming device, a netbook, an ultrabook, a wearable device (smart watch, smart clothing, smart glasses, smart wrist band, smart jewelry such as smart ring or smart bracelet), an entertainment device (e.g., a music or video device, or a satellite radio), a vehicular component, an Internet-of-Things (IoT) device, a machine-type communication (MTC) device, an evolved or enhanced machine-type communication (eMTC) device, or any other suitable device that is configured to communicate via a wireless medium.

FIG. 2 illustrates a block diagram of an example media device 106, according to some embodiments. Media device 106 may include a streaming module 202, a processing module 204, a storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1A and 2, in some embodiments, user 132 may interact with media device 106 and display device 108 via, for example, remote control device 110. For example, user 132 may use remote control device 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 for playback to user 132. Mobile device 150 may provide additional control and communication with media device 106.

In some embodiments, streaming module 202 may transmit the content to display device 108 in real time or near real time as it receives such content from content server(s) 120. In some embodiments, media device 106 may store the content received from content server(s) 120 in storage/ buffers 208 for later playback on display device 108.

Coordination Between a Media Device, a Mobile Device, and a Display Device.

FIG. 3 illustrates an example process 300 for displaying multiple multimedia segments in various formats within multiple display areas of a display device, according to some embodiments. In some embodiments, process 300 can be performed by a computing device, such as media device 106 or display device 108, or the combination of both even though some descriptions may be provided for media device 106 only, or content server 120. Descriptions below may use media device 106 as an example of a computing device. Processes 300 can be performed by processing logic that can comprise hardware (e.g., circuitry, dedicated logic, programmable logic, microcode, etc.), software (e.g., instructions executing on a processing device, such as by controller or a processor), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

At 302, media device 106 can receive a first multimedia segment including a plurality of frames in a first format. For example, as shown in FIG. 4A, media device 106 can receive multimedia segment 163 including a plurality of frames, such as a frame 411, a frame 413, or a frame 415, which are all in a first format. The multiple frames, such as frame 411, frame 413, or frame 415 may be generated by mobile device 150, and may be received by media device 106.

At 304, media device 106 can determine a second format adapted to fit into a first display area of a display device to display each of the plurality of frames of the first multimedia segment within the first display area. The display device includes the first display area and a second display area at least partially disjoint from the first display area. For example, as shown in FIG. 4A, display device 108 includes the first display area 171 and the second display area 173 at least partially disjoint from the first display area 171. In some embodiments, there may be a third display area 403 of display device 108. Media device 106 can determine a second format adapted to fit into the first display area 171 to display each of the plurality of frames of the multimedia segment 163 within the first display area 171.

In some embodiments, the second display area 173 can be completely disjoint from the first display area 171. The first display area 171 and the second display area 173 can be of a rectangular shape of a substantially same height. In some embodiments, the second display area 173 can overlay with the first display area 171 and can be partially disjoint from the first display. In some embodiments, as shown in FIG. 4B, the first display area 171 can have a first width A, the second display area 173 can have a second width B satisfying a golden ratio condition (A+B)/A=1.618. In some embodiments, as shown in FIG. 4B, the first display area 171 can be in a primary screen 172, and the second display area 173 can be in a secondary screen 174, where primary screen 172 and secondary screen 174 can be two separated display devices working together to function as one logic display device, e.g., display device 108. Secondary screen 174 can be attached to primary screen 172, but a separated entity by itself. For example, secondary screen 174 can be detached from primary screen 172 and primary screen 172 still functions as a display area without secondary screen 174. Using secondary screen 174 to form a logical display device 108 including secondary screen 174 and primary screen 172 can save cost than making a big physical display device 108 including both the display areas of secondary screen 174 and primary screen 172. In some embodiments, secondary screen 174 can be dedicated for advertisement. In this way, the viewer may not be interrupted and annoyed by advertisement interruption. In some embodiments, secondary screen 174 can be attached at the left side, right side, top, or bottom of primary screen 172.

In some embodiments, the second format for multimedia segment 163 adapted to fit into the first display area 171 can be different from the first format for multimedia segment 163 when received. The first format can include a first video aspect ratio, and the second format can include a second video aspect ratio different from the first video aspect ratio. The first video aspect ratio or the second video aspect ratio includes a ratio of 19:6, 4:3, 16:10, 47:20, 16:9, 1.375:1, 1.78:1, 1.85:1, 2.39:1, 2.40:1, 2.35:1, 2.39:1, 9:16, or 4:5. In some embodiments, the second format and the first format may only differ in properties related to the display area for multimedia segment 163. For example, the first format and the second format may have one or more shared video file format, resolution, compression techniques, frame rate, bitrate, container, or codec, but only differ in properties related to the display area such as the aspect ratio.

In some embodiments, media device 106 can convert multimedia segment 163 in the first format into the multimedia segment 162 in the second format before displaying the plurality of frames of the multimedia segment 163 within the first display area in the second format. In doing so, each of the plurality of frames of multimedia segment 163 in the first format can be converted into a plurality of corresponding frames including a frame 431, a frame 433, and a frame 435. Frame 431 and frame 411 can have the same content, but in different format related to the display area. In some embodiments, multimedia segment 163 in the first format can be the same as the second format, and no conversion may be needed for media device 106 to display multimedia segment 163 in the second format in the first display device 171. In some embodiments, multimedia segment 163 in the first format or multimedia segment 162 in the second format can be different from the default format of display device 108. Accordingly, the first display area 171 can be a part of display device 108, and the second display area 173 can be another part of display device 108. Display device 108 can have a default display format, which can be a format different from the first format or the second format, and can have capability to display multimedia segment 163 or multimedia segment 162 in the default format of display device 108. In some embodiments, media device 106 can have the capability to choose to display multimedia segment 163 in the first format, or in the default format of display device 108, or in the second format. In some embodiments, the first display area 171 can be in primary screen 172, and the second display area 173 can be in the secondary screen 174.

At 306, media device 106 can determine a second multimedia segment related to the first multimedia segment to be substantially concurrently displayed within the second display area of the display device. In some embodiments, media device 106 can determine, based on a user profile or content of the first multimedia segment, a second multimedia segment related to the first multimedia segment to be displayed within the second display area of the display device within the predetermined time interval. In some embodiments, the user profile can be identified based on an identification of the display device. For example, media device 106 can determine, based on user profile 166 or content of multimedia segment 163, multimedia segment 164 related to multimedia segment 163 to be displayed within the second display area 173 of the display device 108 within the predetermined time interval. In some embodiments, user profile 166 can be identified based on an identification of display device 108, or based on an identification of media device 106. Accordingly, multimedia segment 164 can be displayed substantially concurrently as multimedia segment 162 being displayed, or within a short predetermined time interval, such as 30 seconds, 1 minute, or some other time interval. In some embodiments, media device 106 may have user profile 166 displayed in the third display area 403. The third display area 403 may further display an advertisement 423 related to user profile 166 or the content of multimedia segment 162.

At 308, media device 106 may display the plurality of frames of the first multimedia segment within the first display area in the second format to fit into the first display area, and display the second multimedia segment related to the first multimedia segment substantially concurrently within the second display area. For example, media device 106 may display the frames, such as frame 431, frame 433, and frame 435, of multimedia segment 162 in the second format in the first display area 171. In addition, media device 106 may display multimedia segment 164 within the second display area 173 of the display device 108 within the predetermined time interval.

In some embodiments, as shown in FIG. 4A, each of the plurality of frames, such as frame 431, frame 433, and frame 435, of multimedia segment 162 are displayed within the first display area 171. By limiting each of the plurality of frames, such as frame 431, frame 433, and frame 435, of multimedia segment 162 to be displayed within the first display area 171, embodiments can enable other display areas, such as the second display area 173 to be used for other purpose, since the content of multimedia segment 162 would not be displayed, overlap, or intersect with other display areas such as the second display area 173. Accordingly, embodiments herein are different from displaying a multimedia segment into a display device, where a frame may only occupy a part of the display area. For multimedia segment 162, all the content of frames of multimedia segment 162 are limited to be displayed within the first display area 171. In addition, the size or ratio of the first display area 171 may be predetermined based on the format of multimedia segment 162, but may not depend on the content of multimedia segment 162, e.g., independent from the content of multimedia segment 162. The content of multimedia segment 162, such as frame 431, frame 433, and frame 435, can be represented by different video format including video aspect ratios, resolutions, and many other format parameters. In some embodiments, the format of multimedia segment 162 may be determined by the device generating multimedia segment 163 that is converted into multimedia segment 162, such as mobile device 150, which uses a format such as the vertical format different from the format for the display device 108 such as the horizontal format.

Even though three display areas, such as the first display area 171, the second display area 173, and the third display area 403 are shown in FIG. 4A, in some embodiments, display device 108 may only include two display areas such as the first display area 171 and the second display area 173. In some embodiments, the first display area 171 and the second display area 173 can be of different shapes, not shown. For example, the second display area 173 can be a smaller rectangle than the first display area 171, or an oval, a circle, a square, or some other shapes. In some embodiments, there can be a plurality of display areas such as 2 display areas, 3 display areas, or more different and separated display areas of display device 108.

In some embodiments, when display device 108 includes the third display area 403, the third display area 403 may be disjoint from the first display area 171 and the second display area 173. In some embodiments, the first display area 171, the second display area 173, and the third display area 403 may be of a rectangular shape of a substantially same height, as shown in FIG. 4A. In some embodiments, the second display area 173 can be adjacent to the first display area 171 at a first side, e.g., a right side, and the third display area 403 can be adjacent to the first display area 171 at a second side opposite to the first side, e.g., a left side. In some embodiments, media device 106 may display substantially concurrently user profile 166 of multimedia segment 162 in the third display area 403, and display substantially concurrently multimedia segment 164, e.g., an advertisement related to multimedia segment 162, on the second display area 173. In some embodiments, by being displayed substantially concurrently, user profile 166, multimedia segment 164, and frames of multimedia segment 162 can be displayed at an exact time instance, or within a small allowable time interval which may depend on the system performance and coordination. For example, in some embodiments, a small allowable time interval may be within 1 microsecond, or 1 second, depending on the content and the application of multimedia segment 162, user profile 421, and multimedia segment 164.

In some embodiments, the content of multimedia segment 162, which can be the same as the content of multimedia segment 163, can include audio content, and multimedia segment 164 can be related to the audio content of multimedia segment 162. In some embodiments, the content of multimedia segment 162 can include at least one object 441 included in a frame, e.g., frame 431 of multimedia segment 162, and multimedia segment 164 can be related to object 441 included in frame 431. In some embodiments, object 441 included in frame 431 can be identified by performing image recognition analysis of frame 431. In some embodiments, the content of multimedia segment 163 or 162 can include ACR content recognized by ACR server 127, and multimedia segment 164 can be related to the ACR content of multimedia segment 163 or 162.

Example Computer System

Figure 5:
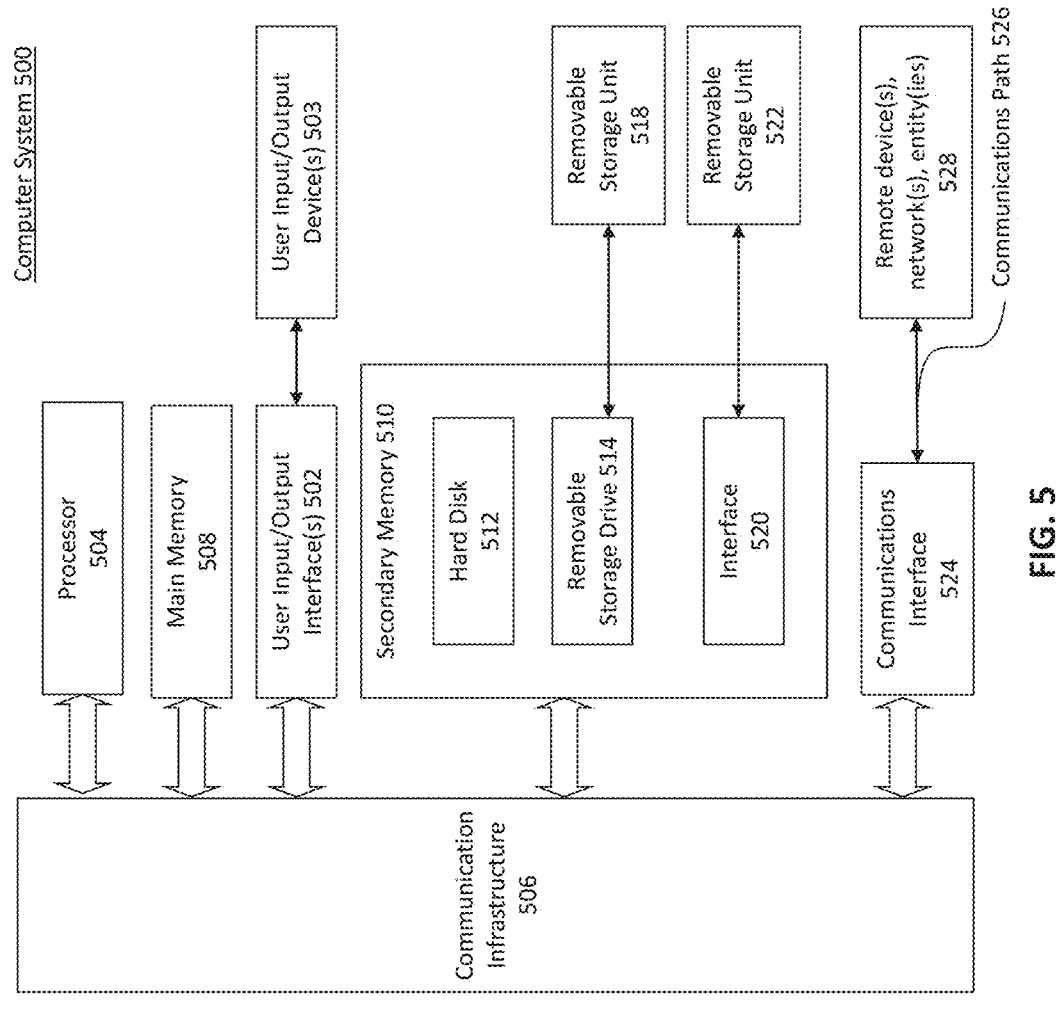
FIG. 5 illustrates an example computer system useful for implementing various embodiments.

Various embodiments may be implemented, for example, using one or more well-known computer systems, such as computer system 500 shown in FIG. 5. For example, media device 106, display device 108, content server 120, system server 126, mobile device 150, advertisement server 129, may be implemented using combinations or sub-combinations of computer system 500 to perform various functions described herein, e.g., by process 300. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   receiving a first video segment including a plurality of frames in a first video aspect ratio, wherein the first video segment includes automatic content recognition (ACR) content recognized using an ACR server;
   determining, by at least one processor, a second video aspect ratio adapted to fit into a first display area of a display device to display each of the plurality of frames of the first video segment within the first display area, wherein the second video aspect ratio is different from the first video aspect ratio and wherein the display device includes the first display area and a second display area at least partially disjoint from the first display area;
   converting the first video segment in the first video aspect ratio into the second video aspect ratio;
   selecting, from among a plurality of video segments stored on a server, a second video segment related to the first video segment to be substantially concurrently displayed within the second display area of the display device, wherein the selecting the second video segment related to the first video segment comprises selecting the second video segment stored on the server based on the ACR content of the first video segment; and
   displaying the plurality of frames of the first video segment within the first display area in the second video aspect ratio to fit into the first display area, and displaying the second video segment related to the first video segment substantially concurrently within the second display area.

2. The method of claim 1, wherein the second display area is completely disjoint from the first display area.

3. The method of claim 2, wherein the first display area and the second display area are of a rectangular shape of a substantially same height.

4. The method of claim 3, wherein the first display area has a first width A, and the second display area has a second width B satisfying a golden ratio condition (A+B)/A=1.618.

5. The method of claim 1, wherein the second display area overlays with the first display area and is partially disjoint from the first display area, and the second video segment is an on-screen display (OSD) of the first video segment.

6. The method of claim 1, wherein the first video segment includes audio content, and wherein the selecting the second video segment related to the first video segment comprises selecting the second video segment stored on the server based on the audio content of the first video segment.

7. The method of claim 1, further comprising identifying an object within a frame of the plurality of frames of the first video segment, the identifying comprising performing image recognition analysis of the frame, wherein the selecting the second video segment related to the first video segment comprises selecting the second video segment stored on the server based on the identified object.

8. A computing device, comprising:
   a display device including a first display area and a second display area at least partially disjoint from the first display area;
   one or more memories; and
   at least one processor, each coupled to at least one of the memories and the display device and configured to:
      receive a first video segment including a plurality of frames in a first video aspect ratio, wherein the first video segment includes automatic content recognition (ACR) content recognized using an ACR server;
      determine a second video aspect ratio adapted to fit into the first display area of the display device to display each of the plurality of frames of the first video segment within the first display area, wherein the second video aspect ratio is different from the first video aspect ratio;
      convert the first video segment in the first video aspect ratio into the second video aspect ratio;
      select, from among a plurality of video segments stored on a server, a second video segment related to the first video segment to be substantially concurrently displayed within the second display area of the display device, wherein to select the second video segment related to the first video segment, the at least one processor is configured to select the second video segment stored on the server based on the ACR content of the first video segment; and
      display the plurality of frames of the first video segment within the first display area in the second video aspect ratio to fit into the first display area, and display the second video segment related to the first video segment substantially concurrently within the second display area.

9. The computing device of claim 8, wherein the first video segment includes audio content, and wherein the selecting the second video segment related to the first video segment comprises selecting the second video segment stored on the server based on the audio content of the first video segment.

10. The computing device of claim 8, wherein the first display area and the second display area are of a rectangular shape of a substantially same height.

11. The computing device of claim 10, wherein the first display area has a first width A, and the second display area has a second width B satisfying a golden ratio condition (A+B)/A=1.618.

12. The computing device of claim 8, wherein the second display area overlays with the first display area and is partially disjoint from the first display area, and the second video segment is an on-screen display (OSD) of the first video segment.

13. A non-transitory computer-readable medium having instructions stored thereon that, when executed by a computing device, cause the computing device to perform operations comprising:

receiving a first video segment including a plurality of frames in a first video aspect ratio, wherein the first video segment includes automatic content recognition (ACR) content recognized using an ACR server;

determining, by at least one processor, a second video aspect ratio adapted to fit into a first display area of a display device to display each of the plurality of frames of the first video segment within the first display area, wherein the second video aspect ratio is different from the first video aspect ratio and wherein the display device includes the first display area and a second display area at least partially disjoint from the first display area;

converting the first video segment in the first video aspect ratio into the second video aspect ratio;

selecting, from among a plurality of video segments stored on a server, a second video segment related to the first video segment to be substantially concurrently displayed within the second display area of the display device, wherein the selecting the second video segment related to the first video segment comprises selecting the second video segment stored on the server based on the ACR content of the first video segment; and displaying the plurality of frames of the first video segment within the first display area in the second video aspect ratio to fit into the first display area, and displaying the second video segment related to the first video segment substantially concurrently within the second display area.

14. The non-transitory computer-readable medium of claim 13, wherein the first video segment includes audio content, and wherein the selecting the second video segment related to the first video segment comprises selecting the second video segment stored on the server based on the audio content of the first video segment.

15. The non-transitory computer-readable medium of claim 13, wherein the first display area and the second display area are of a rectangular shape of a substantially same height.

16. The non-transitory computer-readable medium of claim 15, wherein the first display area has a first width A, and the second display area has a second width B satisfying a golden ratio condition (A+B)/A=1.618.

17. The non-transitory computer-readable medium of claim 13, wherein the second display area overlays with the first display area and is partially disjoint from the first display area, and the second video segment is an on-screen display (OSD) of the first video segment.

* * * * *